United States Patent [19]
Salecker et al.

[11] Patent Number: 6,006,149
[45] Date of Patent: Dec. 21, 1999

[54] ACTUATING APPARATUS

[75] Inventors: Michael Salecker, Bühl; Martin Zimmermann, Sasbach, both of Germany

[73] Assignee: LuK Gertriebe-Systeme GmbH, Bühl/Baden, Germany

[21] Appl. No.: 08/790,147

[22] Filed: Jan. 28, 1997

[30] Foreign Application Priority Data

Jan. 29, 1996 [DE] Germany .......................... 196 02 874

[51] Int. Cl.⁶ .................................................. G06G 7/70
[52] U.S. Cl. .............................. 701/51; 701/87; 477/34; 477/115
[58] Field of Search .................................. 701/51, 56, 7, 701/87, 62, 77; 477/115, 34, 166, 180, 125, 156

[56] References Cited

U.S. PATENT DOCUMENTS

| | | | |
|---|---|---|---|
| 5,390,117 | 2/1995 | Graf et al. | 701/56 |
| 5,475,595 | 12/1995 | Asahara et al. | 701/51 |
| 5,508,574 | 4/1996 | Vlock | 310/113 |
| 5,563,784 | 10/1996 | Miener | 701/51 |

*Primary Examiner*—William A. Cuchlinski, Jr.
*Assistant Examiner*—Yonel Beaulieu
*Attorney, Agent, or Firm*—Darby & Darby

[57] ABSTRACT

An apparatus for actuating a torque transmitting system and/or a transmission in the power train of a motor vehicle has a control unit which is used to monitor and/or calculate operational parameters and conditions of the motor vehicle. The control unit remains active after the motor vehicle ignition is turned off, and also stores in memory operational parameters and conditions for subsequent use when the motor vehicle is again activated.

46 Claims, 9 Drawing Sheets

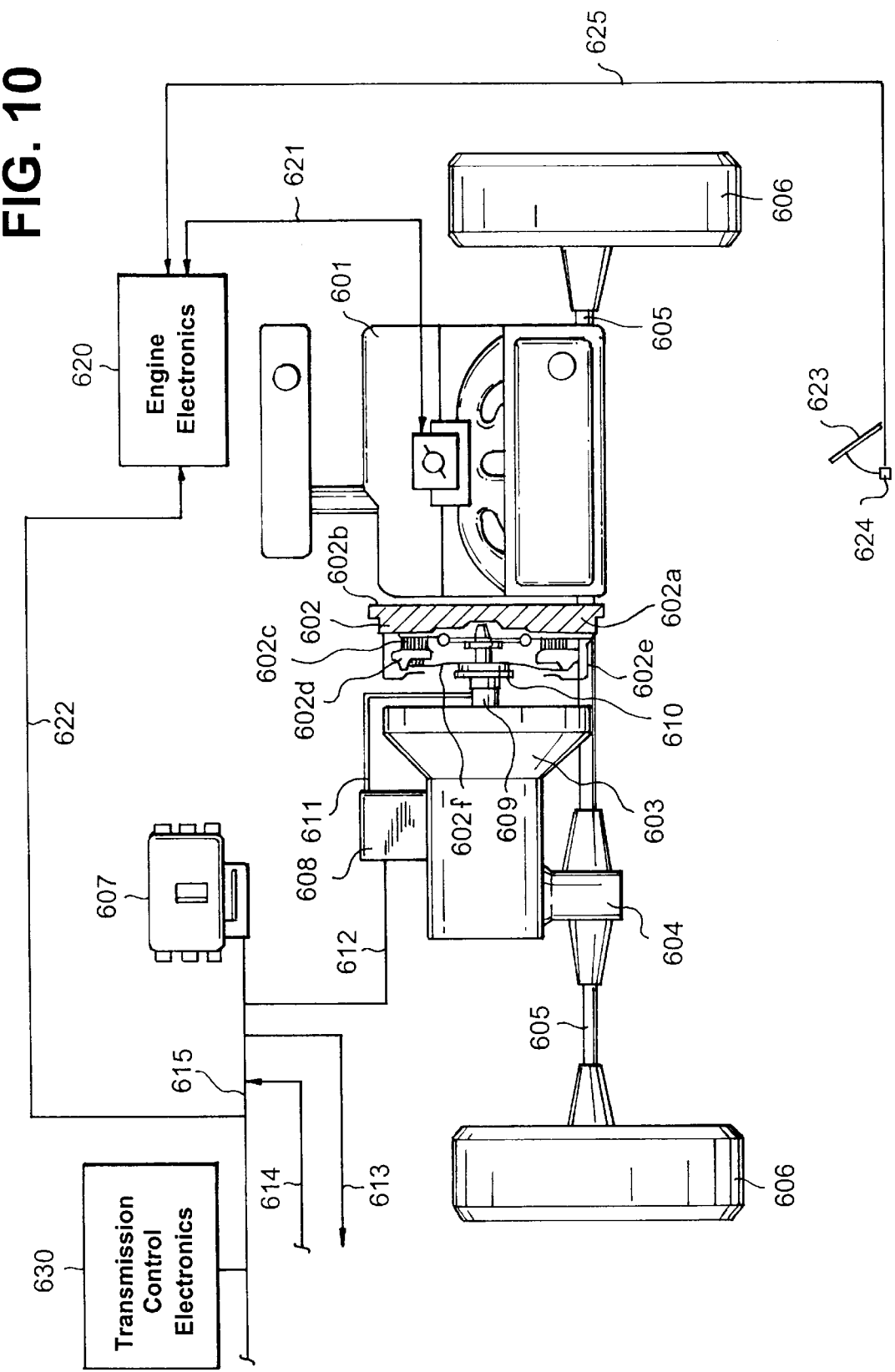

ACTUATING APPARATUS

BACKGROUND OF THE INVENTION

The present invention relates to an apparatus for automated actuation of a torque transmitting system, such as for example a clutch, a friction clutch, a disc clutch or a torque converter with a bypass (lockup) clutch, in the power train of a vehicle with a driving aggregate (prime mover), such as a combustion engine, and a transmission, with a control unit which communicates with sensors and eventually (if necessary) with other electronic units, and with an actuator or actor which can be activated by the control unit to actuate the torque transmitting system, the control unit being activated for example in response to turning on of the ignition system of the vehicle.

The invention further relates to an apparatus for automated actuation of a transmission in the power train of a vehicle with a driving aggregate (prime mover) and a torque transmitting system, with a control unit which communicates with sensors and eventually with other electronic units and which is activated, for example, in response to activation of the ignition system of the vehicle, with an actuator or actor which is activatable by the control unit to actuate the transmission, such as to shift into different gear ratios.

In such an apparatus, the control unit remains activated when the ignition system of the vehicle is activated in order to ensure that an automated actuation of an aggregate can be carried out at any time.

In a conventional apparatus, the control unit is deactivated, as a rule, immediately after the turning off of the ignition system or shortly thereafter in order to ensure a reliable engagement of the clutch and in order to be in a position to store information (data). This interval of time is within the range of one second so that, for example, one cannot further monitor (follow) long-range effects of the torque transmitting system. Such a long-range effect is, for example, the thermal behavior of the torque transmitting system which relaxes only with a rather long interval following the stoppage of the vehicle (turning off of the ignition), i.e., the temperature of the torque transmitting system varies for an extended interval of time following a stoppage of the vehicle and the turning off of the ignition system. For example, if such data pertaining to the temperature of the torque transmitting system are not determined by resorting to a relatively expensive sensor which is likely to fail, it is advisable to calculate the temperature of the torque transmitting system. The calculation and storing of data, such as for example, temperature data, takes place only when the control unit is active (operative).

SUMMARY OF THE INVENTION

An object of the present invention is to provide an apparatus of the above outlined character which exhibits advantages in comparison with conventional systems. For example, one can dispense with sensors in that, in lieu of monitoring various parameters with a sensor, the parameters are calculated or ascertained by the control unit.

Another object of the invention is to provide an apparatus which ensures a more satisfactory operational reliability and operativeness and, at the same time, can be produced in a simple and inexpensive manner.

This is accomplished with the novel apparatus in that, subsequent to a turning off of the ignition system of the vehicle, the control unit remains active in dependency upon at least one parameter, such as for example an operational parameter.

It is of advantage if, subsequent to a turning off of the ignition system, the control unit remains active as a function of time. This can take place, in an advantageous manner, in that the control unit deactivates itself automatically after the expiration of a predetermined interval of time. For example, such predetermined interval of time can depend upon the actual operating point. In this case, such interval of time can be obtained from a memory unit (data storage).

It can also be of advantage if, subsequent to a turning off of the ignition system, the control unit remains active in dependency upon parameters and the control unit deactivates itself in an automatic manner when a threshold value is reached, exceeded or not reached. For example, such a parameter can be constituted by a calculated or otherwise ascertained temperature, a deactivation of the control unit taking place when the temperature drops below a threshold value. Furthermore, such a parameter can be an operational parameter of the vehicle such as, for example, the temperature of the oil in the engine, the temperature of the cooling water, or other parameters.

Furthermore, it can be of advantage in the novel apparatus if, as a function of time, the control unit calculates or otherwise ascertains, at least one temperature of the torque transmitting system and/or of a transmission, and the thus obtained information is stored in a data storage which can be integrated into the control unit; after turning off of the ignition system, the control unit remains active at least until the thus ascertained temperature at least reaches, exceeds or fails to reach a preselectable threshold value. The preselectable threshold value can vary in dependency upon the operating point or it can be fixed for the entire operating range. The values can be ascertained by means of characteristic fields or they can be obtained from data storage units. A determination of the temperature can take place by resorting to characteristic fields or to stored data. Furthermore, a temperature can be ascertained as a function of time, for example, by resorting to an iterative determination of the temperature which means that the temperature at the instant t is taken into consideration for a determination of a temperature at the instant t+Δt.

For example, the novel apparatus for automated actuation of a torque transmitting system, which may be comprised of, for example, a friction clutch and/or a transmission in the power train of a vehicle with a driving aggregate (prime mover), with a control unit which communicates with sensors and eventually also with other electronic units and which is activated in response to turning on of the ignition system, with an actuator or actor which is regulatable by the control unit to actuate the torque transmitting system can be designed in such a way that, after turning off of the ignition system, the control unit remains active for a limited interval of time, namely for the duration of the trailing (follow-up or running-out) time. The control unit deactivates itself upon expiration of the interval of trailing (follow-up or running out) time.

In accordance with a further novel concept, it can be of advantage in an apparatus for automated actuation of a torque transmitting system, such as for example a friction clutch and/or a transmission in the power train of a vehicle with a driving aggregate (prime mover), with a control unit which is in signal-transmitting connection with sensors and eventually (if necessary) also with other electronic units, with an actuator or actor (hereinafter called "actor" for short, except in the Abstract and in the claims) which is activatable by the control unit to actuate the torque transmitting system and/or a transmission, if subsequent to a turning off of the ignition system, for example with an ignition key, the control unit remains activated for a limited interval of time, namely for the duration of the trailing (follow-up or running out) time and the control unit deactivates itself after the expiration of the interval of trailing (follow-up or running-out) time.

Furthermore, it is advantageous to iteratively ascertain the temperature of at least one component part of the torque transmitting system and/or of a transmission.

In accordance with the inventive concept, it is of advantage to calculate the temperature $T_n$ at the instant $t_n$, for example, by resorting to the following equation $$T_n = T_{n-1} + P_{su} * \Delta t / C - \alpha * T_{n-1} * \Delta t / C \quad (1)$$

wherein $T_{n-1}$ denotes the temperature at the instant $t_{n-1}$, $\Delta t = T_n - T_{n-1}$, C denotes the heat capacity of a component part, for example, of a torque transmitting system and/or of a transmission, $\alpha$ is a cooling factor, and $P_{Zu}$ is the calculated supplied heat input.

It can also be advantageous to ascertain the cooling factor $\alpha$ in accordance with the following equation $$\alpha = F_4 + (F_2 + F_3 * n_m) * F_1 \quad (2)$$

wherein $n_m$ denotes the engine RPM and the values of $F_1$ through $F_4$ are preselectable parameters.

It can equally be advantageous to ascertain two temperatures of two component parts, for example, of the torque transmitting system and/or of the transmission, according to the following equation $$T_{a,n} = T_{a,n-1} + (P_{zu} - P_{transfer}) * \Delta t / C \quad (3)$$

which is useful for the determination of the temperature $T_{a,n}$ of the first component part at the instant $t_n$ and the following equation $$T_{b,n} = T_{b,n-1} + (P_{transfer} - P_{k\ddot{u}hl}) * \Delta t / C \quad (4)$$

being useful for the determination of the temperature $T_{b,n}$ of the second component part. In the above equations, $P_{Zu}$ is the supplied heat input, $P_{transfer}$ the output which is transmitted between the two component parts, $P_{K\ddot{u}hl}$ is the cooling action, $T_{a, n-1}$ and $T_{b,n-1}$ are the temperatures at the instant $t_{n-1}$, $\Delta t = t_n - t_{n-1}$, and $C_1$ and $C_2$ are the heat capacities of the first and second component parts.

In accordance with the invention, it can be advantageous if the control unit is capable of storing data in a memory and of addressing data, i.e., recovering data, from such memory.

It can also be advantageous if the control unit generates a signal which is indicative of time or receives such signal by way of a conductor.

In accordance with a further advantageous development of the invention, it can be of advantage if the transmission is a manual transmission, or if the transmission is automated by means of at least one actor by way of a control unit.

Furthermore, it can be particularly advantageous if the apparatus is constructed in such a way that the control unit monitors with at least one sensor, at least during the still activated phase following the turning off of the ignition system of the vehicle, the positions of the actuating means for the actuation of the torque transmitting system and/or of the transmission and, when a preselectable position is exceeded, the control unit initiates an adjustment of the actuating means to a desired position.

In accordance with a further aspect of the invention, it can be advantageous to carry out a method of actuating a torque transmitting system by means of the aforedescribed apparatus.

In this connection, it can be advantageous if the control unit stores parameters or data shortly prior to its deactivation and, subsequent to renewed actuation, such parameters are addressed by the control unit and recovered from the memory, and the thus recovered data are utilized by the control unit to calculate parameters denoting desired values at the instant of renewed activation.

It can be equally advantageous if such stored parameters or data denote an actual temperature at the instant shortly prior to deactivation as well as at the time of such deactivation.

It is desirable to ascertain, on the basis of such stored parameters or data, at least one actual temperature at the instant of renewed activation of the control unit.

Furthermore, it can be advantageous if, prior to its deactivation, the control unit stores parameters or data and, subsequent to its renewed activation, addresses and recovers such parameters from at least one memory and utilizes the recovered data to ascertain parameters denoting actual values at the time of renewed activation.

The invention will be explained in greater detail with reference to the Figures.

DESCRIPTION OF THE DRAWINGS

FIG. 10 is a schematic representation of a vehicle with the present invention.

DETAILED DESCRIPTION OF PREFERRED EMBODIMENTS

Figure 1:
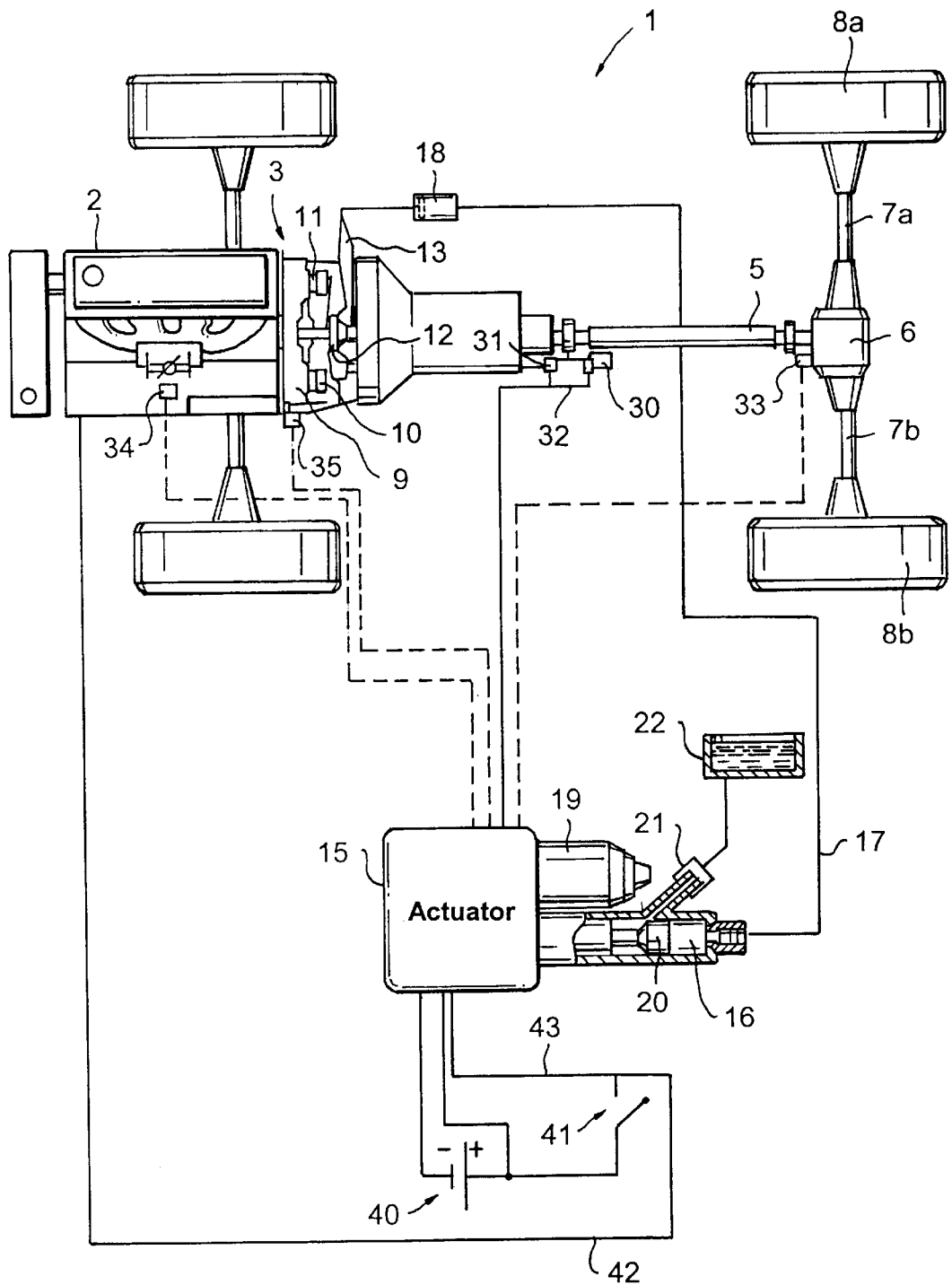
FIG. 1 is a schematic representation of a vehicle with an apparatus according to the present invention.

FIG. 1 shows a vehicle 1 with a driving aggregate (prime mover) 2, such as a combustion engine or a hybrid driving arrangement with an electric motor, with a torque transmitting system 3 and a transmission 4, the transmission 4 being followed by a driving axle 5 which transmits torque to two drive shafts 7a, 7b by way of a differential 6, the shafts serving, in turn, to drive the wheels 8a and 8b. The illustrated torque transmitting system 3 is a friction clutch with a flywheel 9, a pressure plate 10, a clutch disc 11, a disengaging bearing 12 and a disengaging fork 13, the disengaging fork 13 being adapted to be acted upon by an actor 15 having a master cylinder 16, a conduit 17 for pressurized fluid, such as a hydraulic conduit, and a slave cylinder 18. The illustrated actor 15 is operated by a pressurized fluid and comprises an electric motor 19 which actuates the piston 20 of the master cylinder 16 by way of a transmission (gearing) so that the torque transmitting system 3 can be engaged and disengaged by way of the pressurized fluid conduit 17, and the slave cylinder 18. The actor 15 further comprises electronics for the actuation and starting of the actor, i.e., the output electronics as well as the control electronics. The actor is provided with a sniffing bore or hole 21 which establishes communication with a reservoir (tank) 22 for a pressure medium.

The transmission 4 of the vehicle 1 is provided with a gear shift lever 30 which, in turn, is provided with a gear recognizing sensor 31 and a shifting intent sensor 32. The latter serves to detect the intention of the driver (operator) to shift into a gear on the basis of the movement of the shifting lever 30 and/or in response to detection of the applied force. The vehicle 1 is further equipped with an RPM sensor 33 which monitors the RPM of the output shaft of the transmission 4 or the RPM of the wheel 8a and/or 8b. Furthermore, there is provided a throttle valve sensor 34 which detects the position of the throttle valve, and an RPM sensor 35 which monitors the RPM of the engine.

The gear monitoring sensor 31 detects the position of the gear shifting elements in the interior of the transmission 4 or the gear ratio which has been selected for the transmission 4 so that its control unit can record, by way of the signal from sensor 31, at least the selected gear ratio of the transmission. Furthermore, by resorting to an analog sensor, one can ensure a recognition (detection) of the movements of internal shifting components of the transmission 4 to thus ensure an early detection of the next-following gear ratio (i.e., to determine in advance the gear ratio about to be selected by the operator of the motor vehicle).

The actor 15 is supplied with electrical energy by a battery 40 and is in uninterrupted current receiving connection therewith. Furthermore, the apparatus comprises a normally multi-stage ignition switch 41 which, as a rule, is actuated by an ignition key to thus turn on the starter of the combustion engine 2 by way of a conductor 42. A conductor 43 serves to transmit a signal to the electronic unit of the actor 15 to thus activate the actor in response to turning on of the ignition system 41.

Figure 2:
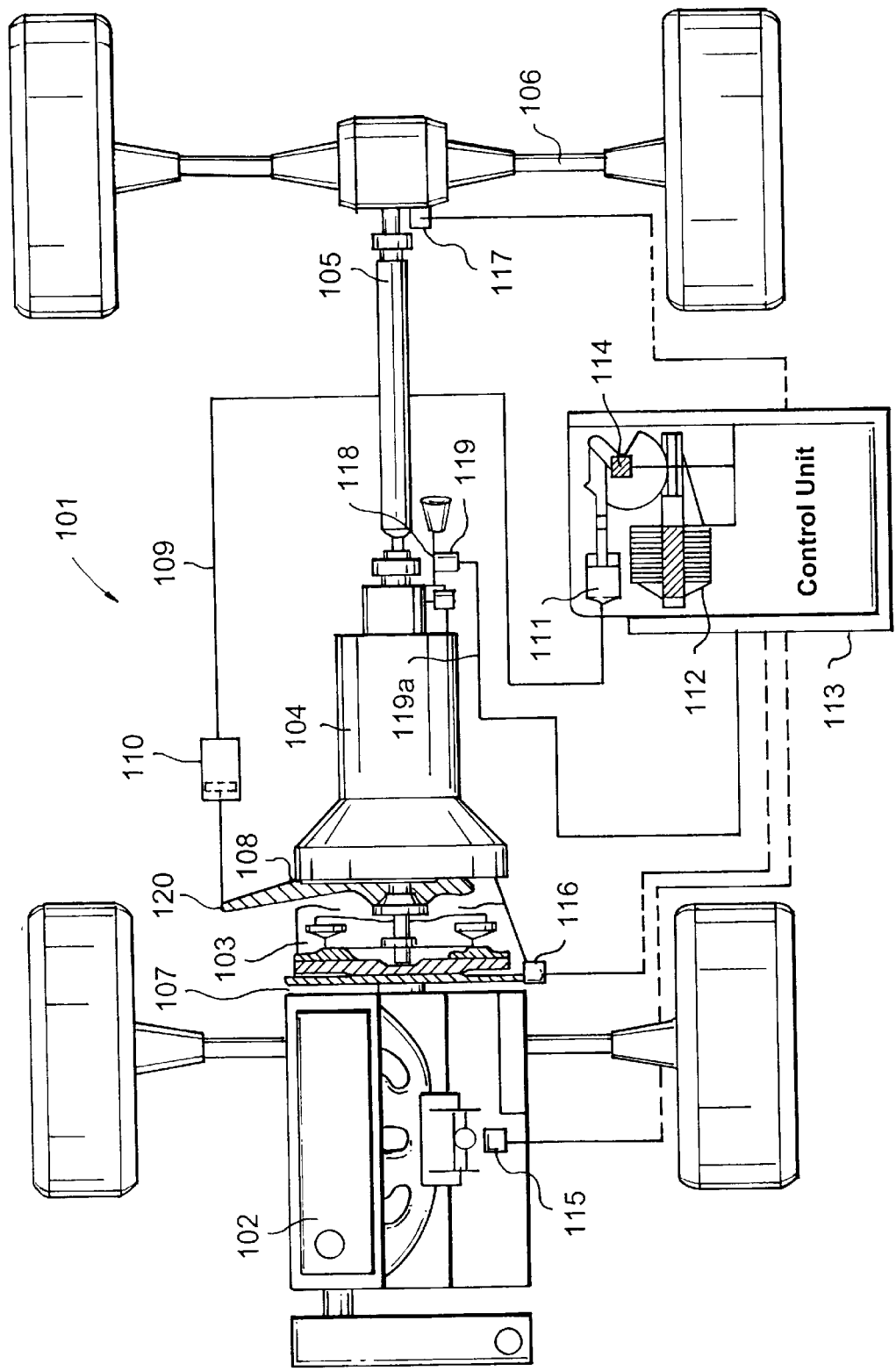
FIG. 2 is a schematic representation of a vehicle.

FIG. 2 shows schematically a vehicle 101 with a driving machine, such as a motor or a combustion engine 102. The power train of the vehicle further comprises a torque transmitting system 103 and a transmission 104. In this embodiment, the torque transmitting system 103 is disposed between the engine 102 and the transmission 104 so that the driving torque supplied by the engine 102 is transmitted by the torque transmission system 103 to the transmission 104 and the output of the transmission 104 transmits torque to an output shaft 105 and an axle 106 downstream of the shaft 105.

The torque transmitting system 103 is a clutch, such as a friction clutch or a magnetic powder clutch or the bypass clutch (lockup clutch) of a torque converter. The clutch can be a self-adjusting clutch which can compensate for wear.

The torque transmitting system can be actuated in an automated way. The transmission 104 is a manual transmission, such as a multi-step reduction gear (range transmission). However, it is equally possible to employ an automatic change-speed gear or an automated change-speed gear. The transmission can be a transmission with an interruption of pulling force. However, it is also possible to design the transmission as one without an interruption of pulling force. Also, an automatic transmission can be equipped with a torque transmitting system, such as a clutch or a friction clutch, at its output end. Furthermore, the torque transmitting system can constitute a starter clutch and/or a torque converter with lockup (bypass) clutch and/or a reversible clutch and/or a safety clutch adapted to transmit torque in a planned manner.

The torque transmitting system 103 comprises an input side 107 and an output side 108, the torque being transmitted from the input side 107 to the output side 108.

If there exists a difference between the RPM at the input side 107 and the output side 108, i.e., if the torque transmitting system 103 operates with slip, there develops in the torque transmitting system, in dependency upon the momentarily transmitted torque or the transmissible torque of the slip RPM, an energy input in the form of energy which is converted into friction heat. In such instance, the kinetic energy of rotation is converted into friction energy and this entails a temperature rise, at least at one or more (certain) portions of the friction surfaces, which can lead to a rise of the temperature and potentially to an overheating of the friction surfaces and possibly to a destruction of the friction surfaces or even of the entire torque transmitting system.

The friction heat which develops in the region of the friction surfaces is led away through the parts of the torque transmitting system 103. If the torque transmitting system is or includes a friction clutch which is affixed to a flywheel and comprises a clutch disc which is disposed axially between the flywheel and a pressure plate of the clutch, the developing friction heat flows away along two paths. Thus, on the one hand, the heat is conveyed from the friction surfaces to the flywheel and, on the other hand, the heat flows from the friction surfaces to the pressure plate of the clutch. The removal (withdrawal) of heat by convection at the instant of the development of such friction heat is considered to be small (minimal) because practically no circulation of air takes place between the friction surfaces (namely between one set of friction surfaces of the clutch disc and the flywheel and/or the other set of friction surfaces of the clutch disc and the pressure plate).

That portion of the quantity of heat which flows to the pressure plate can be said to constitute a certain fraction of the overall quantity of heat, the remaining quantity of heat flowing away by first approximation by way of the flywheel. One can assume that the quantity of heat flowing away by way of the pressure plate constitutes about 50% of the developing quantity of heat. It is preferred to select a value in the range of between 25% and 75%.

The determination or calculation of the developed or developing friction energy can be carried out, for example, by integrating the value of the RPM difference between the input side 107 and the output side 108 of the torque transmitting system 103 and multiplying by a value denoting the transmitted clutch torque as a function of time.

A further possibility resides in that a decreasing friction energy is ascertained (determined) by resorting to measured values and characteristic curves or characteristic fields.

The starting (operation) of the torque transmitting system 103 is effected by a control unit 113 which can comprise the actor and the control (regulating) electronics. The control unit 113 can comprise the control- and output electronics for starting (operating) a driving motor (electric motor) 112. In this manner, one can achieve for example that the system must be provided with a single space (compartment), namely a space for the actor and for the electronics. The actor encompasses the driving motor 112, such as an electric motor, and this electric motor 112 can act upon a master cylinder 111 by way of a transmission (such as a worm gearing or a spur gear transmission) and by way of a pusher or plunger rod. The movements of the plunger rod or of the piston of the master cylinder 111 are monitored by a sensor 114 which determines the movements of (distances covered by) the clutch. The master cylinder 111 is connected with a slave cylinder 110 by a conduit 109 for a pressurized fluid, such as a hydraulic conduit. The slave cylinder 110 is connected with a clutch disengaging means 120. The clutch disengaging means 120 is actuated in response to movements of the output element (piston or cylinder) of the slave cylinder 110, and this selects the torque which can be transmitted by the clutch 103.

The actor for actuating the torque transmitting system can be operated by a pressurized fluid, i.e., it can be equipped with or it can cooperate with hydraulic master and slave cylinders. However, it is also possible to actuate the actor pneumatically, and an electric motor (such as 112) which effects movements of the master cylinder can be operated by electronic means.

If the torque transmitting system includes or constitutes a friction clutch, the selection of the transmissible torque is effected in that the friction linings are clamped between the flywheel and the pressure plate in a planned manner. The force acting upon the pressure plate and/or upon the friction linings can be selected in a planned manner by selecting the position of the disengaging means 120, such as a disengaging fork or a central disengaging member, and the pressure plate can be moved between two end positions and can be held in a desired position between such end positions. The one end position is assumed by the pressure plate when the clutch is fully engaged, and the other end position is assumed by the pressure plate when the clutch is fully disengaged. In order to select a transmissible torque which, for example, is less than the momentarily prevailing engine torque, one can select, for example, a position of the pressure plate which is disposed within the range between the two end positions. However, it is also possible to select transmissible clutch torques which are definitely above the momentarily prevailing engine torque. In this manner, one can transmit normally existing engine torques but irregularities of torque, such as, for example, in the form of torque peaks, are or can be damped and/or isolated.

Furthermore, and in order to regulate the operation of the torque transmitting system, one employs or can employ sensors which monitor the entire system, at least at times, and transmit condition-denoting signals and measurement values which are necessary for the regulation of the torque transmitting system, it being further possible to establish a signal-transmitting connection to other electronic units.

The apparatus shown in FIG. 2 employs a throttle valve sensor 115, an engine RPM sensor 116, as well as a tachometer sensor 117; these sensors transmit corresponding measurement values or information to the control unit 113. Furthermore, at least one sensor 119, 119a is provided at the actuating lever, such as a gear shifting lever 118 of a manual transmission. The sensor 119 detects the intent to shift and/or recognizes the then active or effective gear ratio and transmits corresponding signals to the control unit. The sensor 119a is connected to (associated with) the transmission 104 and detects the actual gear ratio.

The control unit 113 is at least temporarily in signal-transmitting connection, i.e., in communication, with all of the sensors and, for the purpose of actuating the clutch, furnishes to the motor, such as the electric motor 112, of the control unit a signal denoting the measured values and/or system input values and/or signals from the sensor or sensors with which it is connected. To this end, a control program in the form of hardware or software is implemented in the control unit 113.

Furthermore, the control unit 113 comprises or communicates with a torque ascertaining (determining) unit, a unit for the determination of the transmission gear ratio, a slippage (slip) ascertaining (determining) unit, and an operating condition determining unit.

The gear ratio determining unit ascertains, on the basis of signals from the sensors 119 and 119a, the actually selected (momentary) gear ratio of the transmission 104. The sensors 119, 119a are respectively associated with (linked to) the shifting lever 118 and to the setting means in the interior of the transmission, such as for example a central shifting shaft (not shown) or shifting rods, to detect the positions and/or the speeds of such monitored parts. In response to signals from these sensors 119 and 119a, and for example on the basis of stored threshold values, the electronics (of the control unit 113) ascertain the momentarily selected (active) gear ratio of the transmission 104.

The torque ascertaining unit ascertains, for example on the basis of available data, the actual engine torque. The parameters which are being resorted to for such purposes can include, for example, the engine RPM, the position of the load lever (the part which determines the rate of fuel admission to the engine), the injection time, the position of the throttle valve, etc. Based on at least one of these values, the actual engine torque can be ascertained with assistance from characteristic fields or characteristic curves. However, it is also possible to ascertain the engine torque from the engine electronics by way of a data bus.

The slip determining (ascertaining) unit calculates or determines the slip in the torque transmitting system in dependency upon the incoming (input) signals. The engine RPM $k_m$ can be determined directly by way of a sensor. The input RPM $n_g$ of the transmission can be ascertained (measured) either directly or by calculating, on the basis of ascertained rotational speed of the wheels, the then prevailing transmission gear ratio as well as the ratio in the power train. The slip is the difference between the engine RPM and the RPM at the input of the transmission 104.

The operating condition determining unit ascertains, on the basis of all incoming signals or information pertaining to the vehicle, to the engine or to the transmission, whether the vehicle is in the process of being started, or is at a standstill or there exists, for example, a function indicating a parking block.

The operational parameters are compared with reference to and evaluated on the basis of values which are stored in the form of characteristic fields or characteristic curves. It is assumed that a starting condition prevails when a determination is made that the load lever (gas pedal) is being actuated, the transmission is not in the neutral gear and the input RPM of the transmission is less than the idling RPM.

The vehicle is assumed to be driven when, upon completion of the starting stage, the slip is less than a predetermined threshold value.

At a predetermined existing driving torque which is calculated on the basis of system input values, the adjusting (setting) element is assigned a position (or such position is calculated) and the electric motor 112 receives a setting signal (or such signal is calculated) which determines the setting (condition) of the motor 112. The operative connection between the master cylinder 111 and the slave cylinder 110 ensures that a movement of the piston of the master cylinder results in a transmission of movement to the adjusting means 120 and the clutch 103 is set (adjusted) in accordance with the torque transmission determining values (parameters).

A further embodiment of the invention can be designed, for example, in such a way that the adjustment of the torque transmitting system is effected by a mechanical actuating device which influences the clutch to set the clutch to any condition between an engaged condition and a disengaged condition. This ensures that the function of planned torque transmission is carried out. If a mechanical actuating system is being employed, it can constitute a linkage which can be actuated and positioned by a servomotor and which can be coupled to a disengaging fork, for example, to control the movements of the disengaging fork. The disengaging fork is or can be connected with a disengaging bearing for the clutch 103 so that, in response to a planned movement of the disengaging bearing, the clutch can be engaged or disengaged in a planned (predeterminable) manner.

The torque transmitting system can also constitute the starter clutch of an automatic transmission, such as, for example, an infinitely variable transmission (see, e.g., commonly owned U.S. Pat. No. 5,169,365 granted Dec. 8, 1992 to Oswald Friedmann for "Power Train"). Such a starter clutch can be operated in a planned manner. Furthermore, the clutch can be installed at the input side and/or at the output side of a transmission, and such a clutch can constitute a starter clutch, a reversing clutch and/or a safety clutch.

If the vehicle is started when the gear ratio of the transmission is too high, a slip in the torque transmitting system develops and such a slip can persist for an excessive interval of time. This entails the development of excessive amounts of energy in the form of friction heat being transmitted to the torque transmitting system and results in a rise of temperature which can cause damage to the torque transmitting system.

In the event of an excessive slip in a torque transmitting system, such as a friction clutch, there develops at a given torque an excessive energy input into the friction linings and this entails a pronounced increase of the developing friction heat. The control unit 113 can ascertain, calculate, and/or determine, on the basis of signals from the sensors, whether or not an increased (excessive) slip exists. The unit 113 can then ascertain the energetic stress upon the torque transmitting system and initiate and/or carry out undertakings which are to prevent an excessive stressing and/or destruction of the torque transmitting system.

Figure 3:
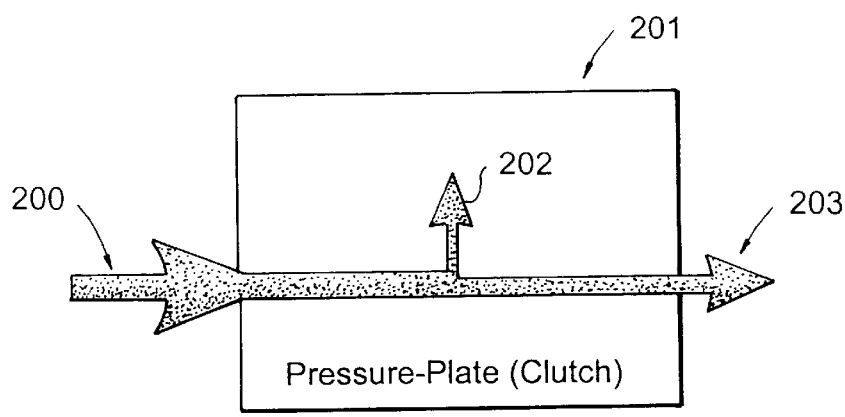
FIG. 3 is a schematic illustration of heat flow in a one-mass model.

FIG. 3 is a schematic diagram which shows how the developing heat distribution can be represented in a model which is used to calculate the temperature of a clutch.

The arrow 200 denotes the quantity of developing heat which is attributable to slip in the torque transmitting system. This value is calculated by considering a share (percentage) factor which must be considered because, in this model, only that quantity of heat which is transmitted to the pressure plate of the friction clutch is being evaluated. The (other) quantity of heat which is being transmitted to the flywheel or which is being taken up by the flywheel plays no role in these considerations (shown in FIG. 3). The quantity of heat (arrow 200 in FIG. 3) is preferably one-half of the overall developed friction heat. The square 201 of FIG. 3 denotes the pressure plate of the clutch, and the arrow 202 denotes that share of the friction energy which is stored in the pressure plate. The arrow 203 is indicative of that portion of heat which leaves the pressure plate, for example, due to heat conduction or convection.

The sum of heat quantities denoted by the arrows 202 and 203 thus corresponds to the heat quantity denoted by the arrow 200. FIG. 3 shows a model for the calculation of the temperature of a clutch, and more specifically of a pressure plate in the clutch. The pressure plate is assumed to constitute a single-mass model, and the mass or heat capacity of the pressure plate is denoted by the square 201. Thus, the temperature rise can be ascertained on the basis of the heat capacity of the element 201 and the difference between the inflowing and outflowing quantities of heat.

Figure 4:
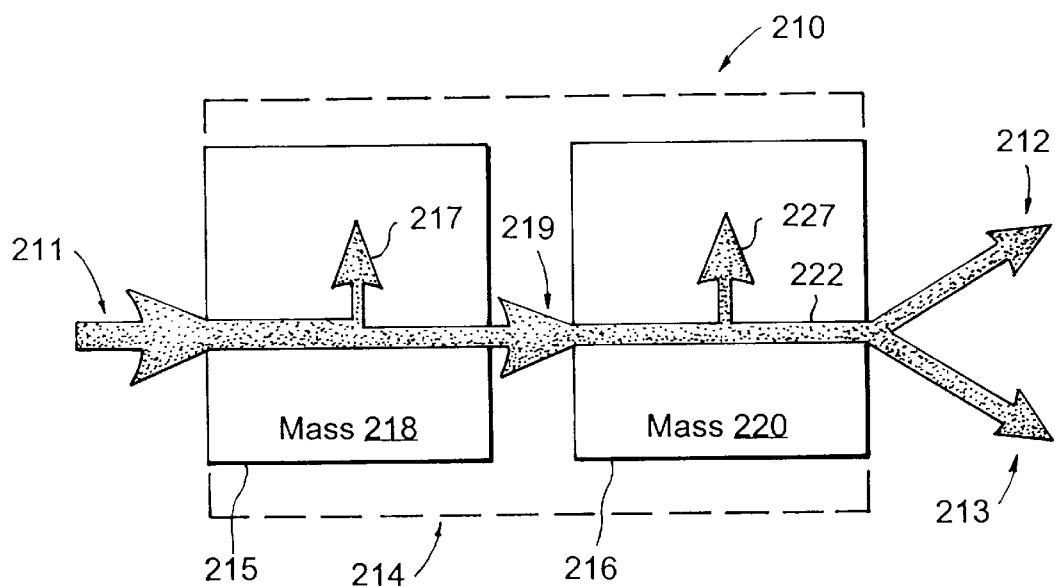
FIG. 4 is a schematic illustration of heat flow in a two-mass model.

FIG. 4 illustrates a twin-mass model 210 wherein the quantity of heat flowing into the clutch or into its pressure plate is denoted by the arrow 211, and the quantity of heat flowing out from the clutch or the pressure plate is denoted by two arrows 212 and 213. This means that the quantity of outflowing heat can be led away via two heat outflow channels. For example, the channel denoted by the arrow 212 can establish a path for heat conduction and the other channel denoted by the arrow 213 can represent, for example, a path for the withdrawal of heat by convection.

The pressure plate or the entire clutch is represented schematically by broken lines, as at 214. The pressure plate or the clutch is represented by or broken up into two masses 215 and 216. In calculating the temperature of the clutch, one starts with the premise that the pressure plate is considered as a unit having two masses. The two masses are shown at 218 and 220 and are thermally conductively connected with each other by a planned selection of heat.

The incoming flow of heat is thus divided into a heat flow 217 which entails a heating of the mass 218, and an outgoing heat flow 219 which flows to the mass 220 to be broken up therein into a portion 221 causing a heating of the mass 220 and a portion 222 flowing from the mass 220. The portion 222 corresponds to the sum of the portions (heat quantities) 212 and 213.

An exchange of heat (indicated by the arrow 219) takes place between the masses 218 and 220. As a rule, and depending upon the temperature, there normally takes place only a flow (transfer) of heat from the mass 218 to the mass 220 because, in most instances, the mass 220 is cooler than the mass 218. Friction heat develops in the region of the mass 218. In a model according to FIG. 4, the pressure plate of the friction coupling is treated, for example, as a twin-mass model. In a further embodiment, one can take into consideration a multiple-mass model with more than two masses.

Figure 5:
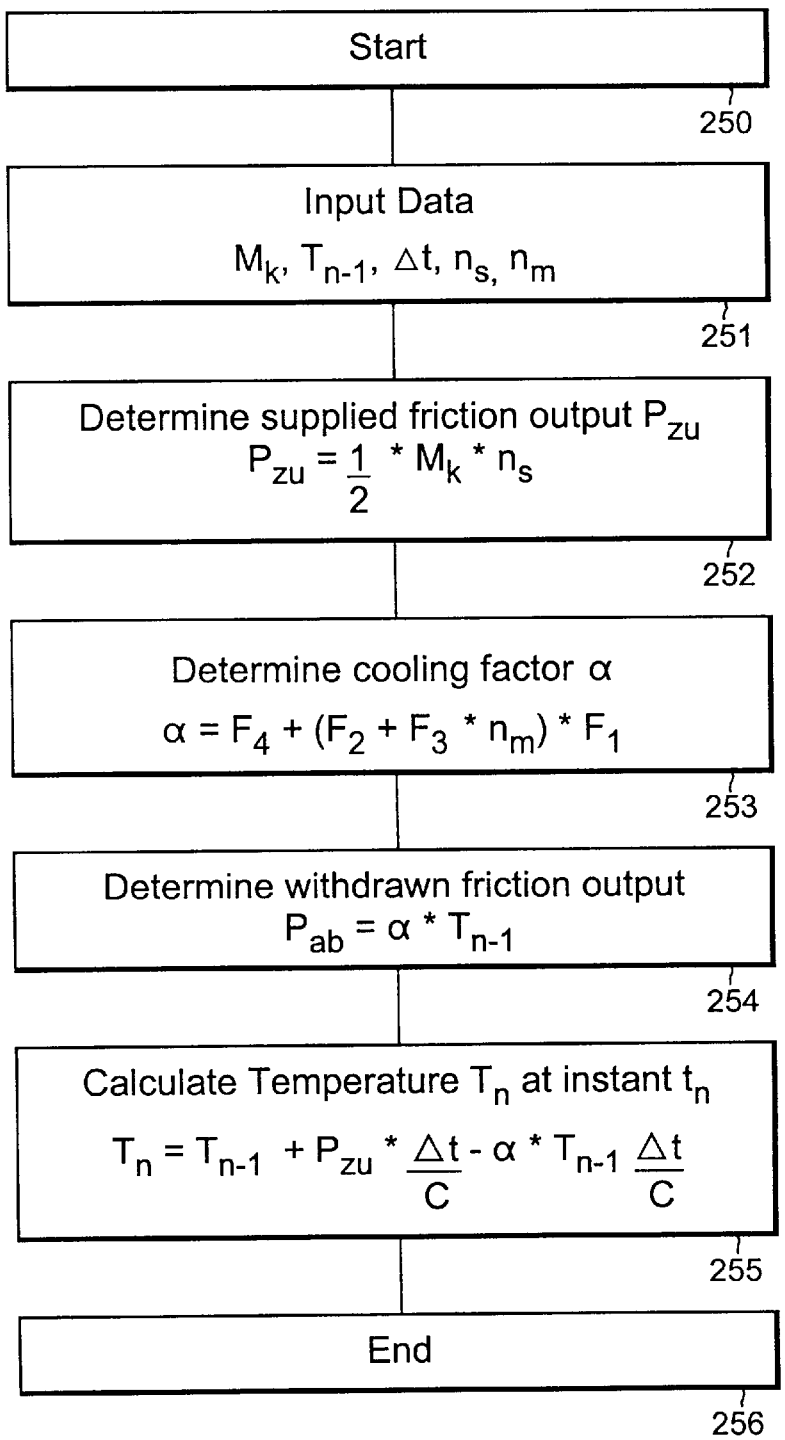
FIGS. 5 to 7 are flow charts illustrating the calculation of temperature.

FIG. 5 is a flow chart which illustrates the calculation of a temperature $T_n$ at the instant $t_n$, for example, the temperature of a pressure plate in a friction clutch. In the calculation shown in this flow chart, the mass has a heat capacity. The calculating procedure starts at step 250. The start can be periodic with a time delay $\Delta t$, and $\Delta t$ can be a fixed value or it can vary in dependency upon operating conditions. As a rule, the determination of the temperature takes place at a frequency which can correspond to the processor cycle or a multiple of such cycle.

Next, at step 251, data are inputted, such as signals or values which are necessary for the calculation of the temperature. Such data are ascertained by sensors, obtained from data storage units, or obtained by way of a data bus. For example, the inputted data can denote the actual clutch torque $M_K$, the temperature $T_{n-1}$ at the instant $t_{n-1}$, $\Delta t$, the engine RPM $n_m$, the slip $n_s$, the transmission input RPM $n_G$, the rotational speed of the wheels, the temperature of the engine, the temperature of the oil in the engine, the temperature of the oil in the transmission, the temperature of the clutch or the temperatures of certain parts of the clutch, the supplying of energy for example by a heat exchanger, and other data.

In order to set up an energy balance, it is advantageous if the output which is transmitted by the clutch to the transmission is ascertained, for example, on the basis of rotational speed multiplied by engine torque or rotational speed multiplied by transmissible clutch torque. Furthermore, it can be advantageous if one takes into consideration the energy which is transmitted to the transmission by the engine heat, e.g., by being transmitted through the clutch bell. It is also possible to take into consideration losses developing as a result of movements of parts in a fluid and to take into consideration an additional energy input based on the synchronizing operations.

The considered withdrawn energy can be, for example, that energy which is transmitted to the surroundings or the surrounding air, or that energy which is transmitted by way of a heat exchanger.

In dependency upon the operating conditions or the time elapsed from the last use of the vehicle, the utilized (resorted to) starting temperature can be a preselectable starting temperature, a calculated temperature, or the temperature in the surrounding area.

A further possible way of determining the temperature of the transmission involves the testing (checking) of a temperature which has been calculated by resorting to detection of temperature-dependent values, such as for example temperature-dependent gear shifting forces or other values. Such temperature-dependent values are used to calculate the temperature and signals denoting the thus calculated temperature are transmitted to the control unit for further calculation in order to ascertain the actual temperature. Thus, the temperature is fed back basically in a control loop or regulating loop.

The next step 252 denotes the calculation of the quantity of heat or frictional output $P_{zu}$ which is being transmitted to the pressure plate in accordance with the equation $P_{zu} = \frac{1}{2} * M_K * n_s$. The factor ½ is indicative of the assumption that only one-half of the friction heat or frictional output flows into the pressure plate, whereas the remaining part is led away by way of the flywheel. Depending upon the dimensioning of the flywheel and of the pressure plate, it is also possible to arrive at an unequal distribution of heat flows on the basis of the division of forces. In such instances, the factors which are utilized in the above equation are between 0.25 and 0.75.

The next step 253 denotes the calculation of the cooling factor $\alpha$ which determines the withdrawn friction output. One considers at least one term which is independent of the rotational speed and also at least one term which is dependent upon the rotational speed (namely the engine RPM). The cooling factor $\alpha$ is ascertained on the basis of the equation $\alpha = F_4 + (F_2 + F_3 * n_m) * F_1$ wherein $n_m$ is the engine RPM and, in this example, the values of $F_1$ through $F_4$ are constant values which are stored in memory. The values $F_i$ wherein i=1 to 4 can also be calculated or obtained from characteristic fields as a function of the temperature. The values of $F_1$ through $F_4$ are preferably within the range of 0 to 10, and the individual values can further depend upon parameters such as the engine RPM. $F_2$ is preferably zero for rotational speeds of less than 300 per minute and is preferably one or other than zero for rotational speeds above 300 per minute. Specific examples of $F_1$, $F_3$, and $F_4$ can be as follows: $F_1=1.04$, $F_3=0.00016$, and $F_4=0.08$. In this instance, the value of $\alpha$ rises abruptly from zero to one at 300 RPM and continues to rise in response to increasing rotational speed.

If the calculated temperature rises above or is below a threshold value, the temperature which is utilized thereafter can be set to assume a fictitious value, particularly at the upper or lower limit of a range, and this value serves as a basis for further calculations. If the determined temperature is within the employed temperature range, then the actual temperature can be utilized as a basis for further calculations. Depending upon the circumstances, the employed (selected) range can be between 0 and 400 degrees Celsius, especially between 80 or 90 and 250 or 300 degrees Celsius.

The next step 254 denotes the calculation of the outflowing or removed output at the instant $T_n$ in accordance with the equation $P_{ab} = \alpha * T_{n-1}$ in dependency upon the temperature $T_{n-1}$ at the instant $t_{n-1}$, i.e., of the preceding instant. The temperature T at the instant $t_{n-1}$ is also designated as $T_{n-1}$.

The next step 255 denotes the calculation of the temperature $T_n$ at the instant $t_n$ in accordance with the following equation:

$$T_n = T_{n-1} + P_{zu} * \Delta t / C - \hat{\alpha} * T_{n-1} * \Delta t / C.$$

This means that, at the instant $t_n$, the temperature T is dependent upon the temperature at the instant $t_{n-1}$ plus a factor which takes into consideration the quantity of supplied heat and a factor which takes into consideration the quantity of outflowing heat which, however, is dependent upon the temperature at the instant $t_{n-1}$. During the next calculation interval, the temperature $T_n$ is utilized as the temperature $T_{n-1}$ in order to ascertain the next-following temperature.

The routine is terminated at step 256 and the actual value of the temperature $T_n$ is stored in memory or is transmitted for further processing.

Figure 6:
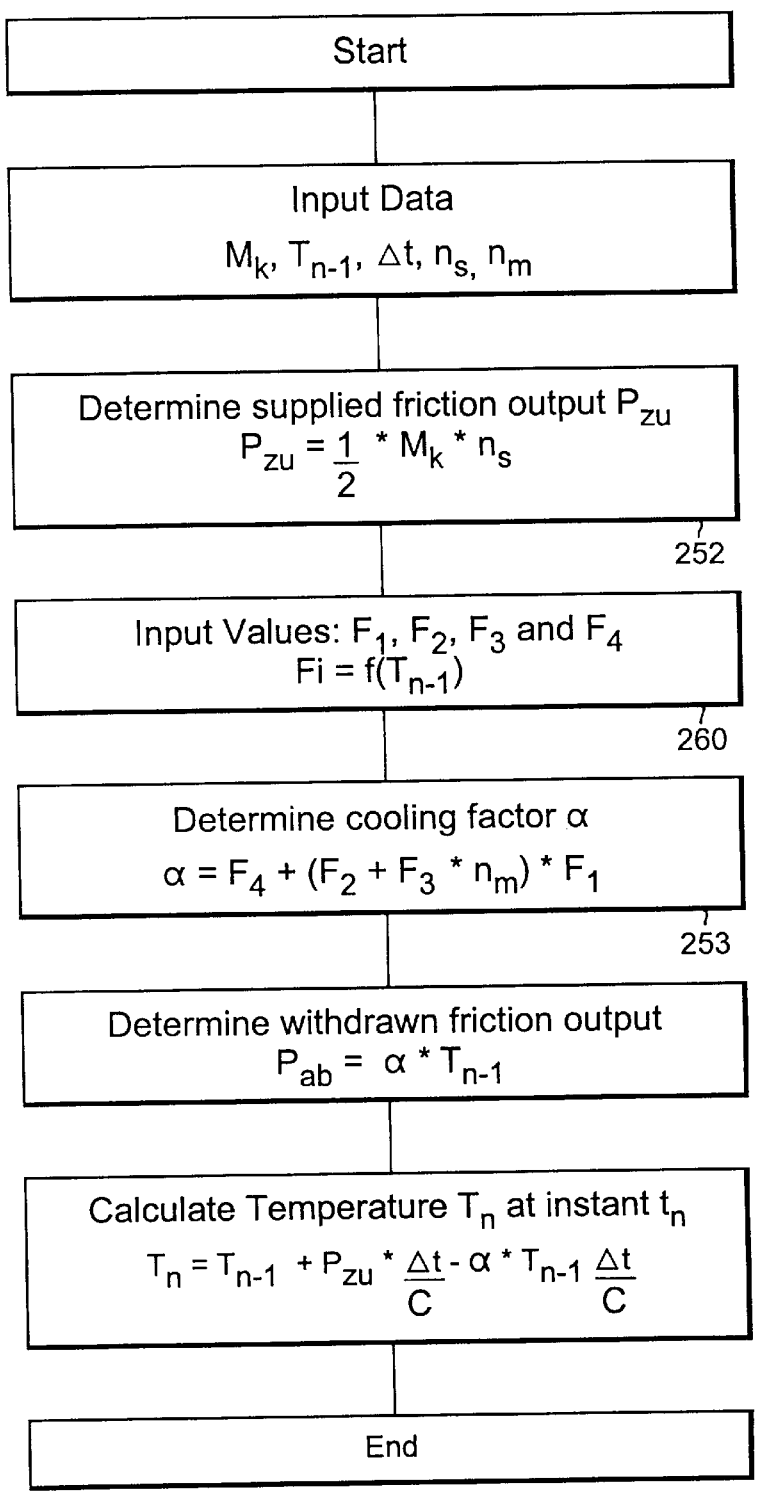

FIG. 6 is a flow chart corresponding to that of FIG. 5 except that, between the steps 252 and 253, there is provided a further step 260 which denotes the supplying of the values of F1 through F4 and wherein $F_i = f(T_{n-1})$, i.e., the values of the summands and factors for the determination of the cooling factor $\alpha$ can, in turn, be functions of the temperature. Furthermore, the heat capacity C can be taken into consideration as a function of the temperature.

Figure 7:
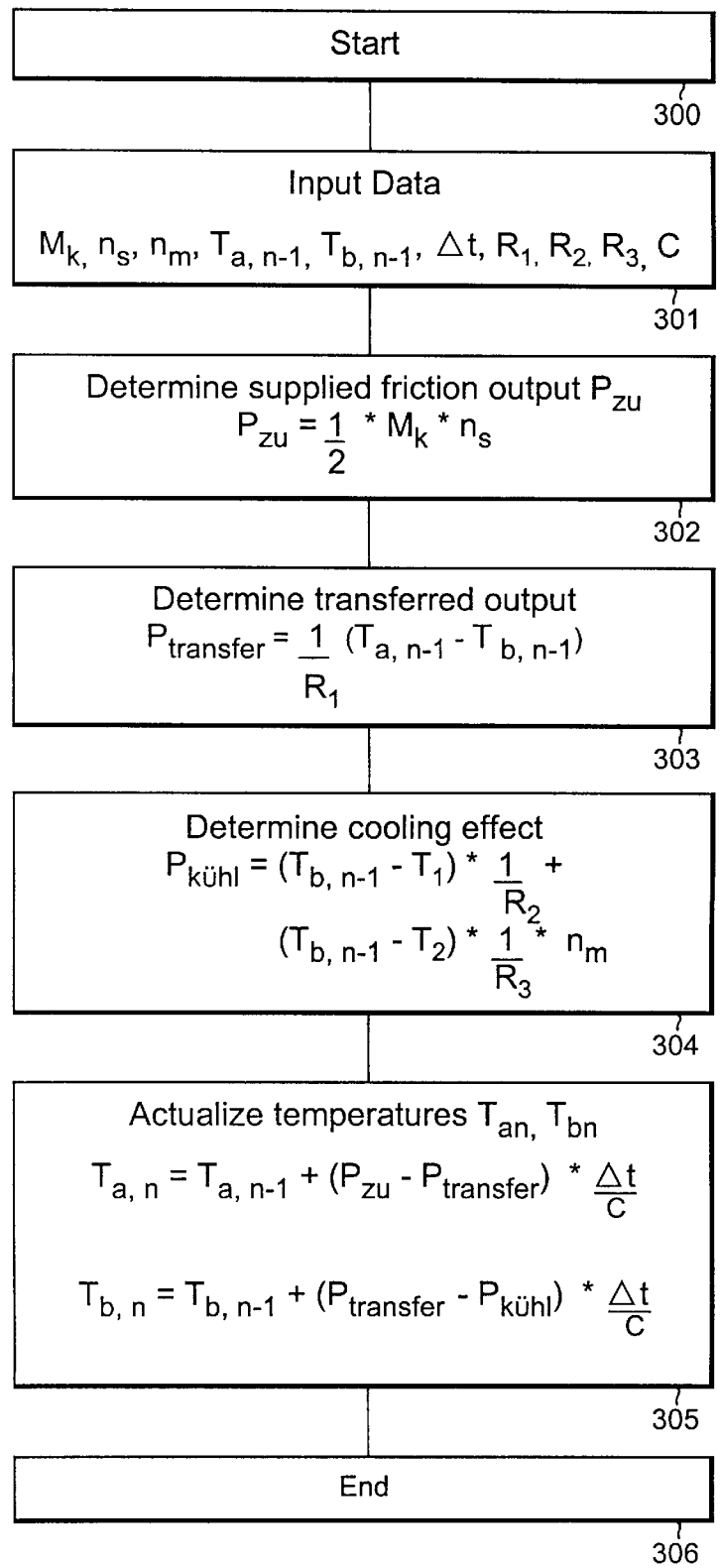

FIG. 7 is a flow chart which illustrates the process of calculating the temperatures $T_a$ and $T_b$ in the case of the utilization of a twin-mass model. The calculating procedure is started at step 300 and is repeated at a cycling frequency $\Delta t$, i.e., periodically or cyclically at a pulse frequency. The time differential $\Delta t$ between successive starting procedures of the method or of the routine can be variable, but is preferably less than one second. Step 301 denotes the supplying (inputting) of system data including the clutch torque $M_K$, the slip RPM $n_s$, the engine RPM $n_m$, the temperature $T_{a,n-1}$ of the mass 218, the temperature $T_{b,n-1}$ of the mass 220, both at the instant $t_{n-1}$, the time differential $\Delta t$ between two executions of the routine, the heat capacity C, and the heat transmission values or heat resistances $R_1$, $R_2$ and $R_3$.

Next, step 302 denotes the determination, such as calculation, of the supplied friction output $P_{zu}$ in accordance with the equation $$P_{zu} = \frac{1}{2} * M_K * n_s.$$

Next, step 303 denotes the determination, such as calculation, of the output or heat quantity which is transferred between the masses 218 and 220 in accordance with the equation $$P_{transfer} = (1/R_1) * (T_{a,n-1} - T_{b,n-1}).$$

This transferred or transmitted output corresponds to (or constitutes) a heat conduit between the two portions or masses 218, 220 of the pressure plate.

Next, step 304 denotes the determination of the cooling effect $P_{kühl}$, which consists of: (a) a portion developing as a result of convection and is a function of the rotational speed, and (b) a portion which develops as a result of heat conduction to the surrounding atmosphere, in accordance with the equation:

$$P_{k\ddot{u}hl}=(T_{b,n-1}-T_1)*1/R_2+(T_{b,n-1}-T_2)*1/R_3*n_m.$$

The temperatures $T_1$ and $T_2$ correspond to reference values for temperatures which develop in the system or are accepted (selected) as references, i.e., the temperature $T_1$ can be resorted to or assumed to constitute the temperature of the surrounding area for the heat conduction, and the temperature $T_2$ is used as a reference temperature for convection. The temperatures $T_{a,n}$ and $T_{b,n}$ are calculated in step 305, and step 306 denotes the termination (end) of the routine.

The actualization is effected in that $$T_{a,n}=T_{a,n-1}+(P_{zu}-P_{transfer})*\Delta t/C \qquad (5)$$

$$T_{b,n}=T_{b,n-1}+(P_{transfer}-P_{k\ddot{u}hl})*\Delta t/C \qquad (6)$$

The temperatures $T_{a,n}$ and $T_{b,n}$ at the instant $t_n$ are obtained on the basis of the temperatures $T_{a,n-1}$ and $T_{b,n-1}$ plus, in each instance, a factor denoting the energy balance between the supplied and withdrawn heat quantities multiplied by the time differential $\Delta t$ between the time instants $t_n$ and $t_{n-1}$ divided by the heat capacities C. In step 305, the heat capacities for the calculation of $T_{a,n}$ and $T_{b,n}$ are assumed to equal C, which takes into consideration that the heat capacities of the partial masses 218 and 220 are identical. In another embodiment, it might be advisable to resort to a different breakup, i.e., to consider two partial masses having different heat capacities C1 and C2. The heat capacity C, or the heat capacities C1 and C2 of the partial masses, can constitute a fixed value or fixed values which are a function of the temperature; the temperature dependency of the heat capacities can be obtained from characteristic fields or can be calculated in accordance with a mathematical equation. It is advantageous if the heat capacity during the existing temperature interval is considered as being basically linear. This makes it possible, if resort is made to characteristic fields or to equations, to save storing capacity in the control unit.

Figure 8:
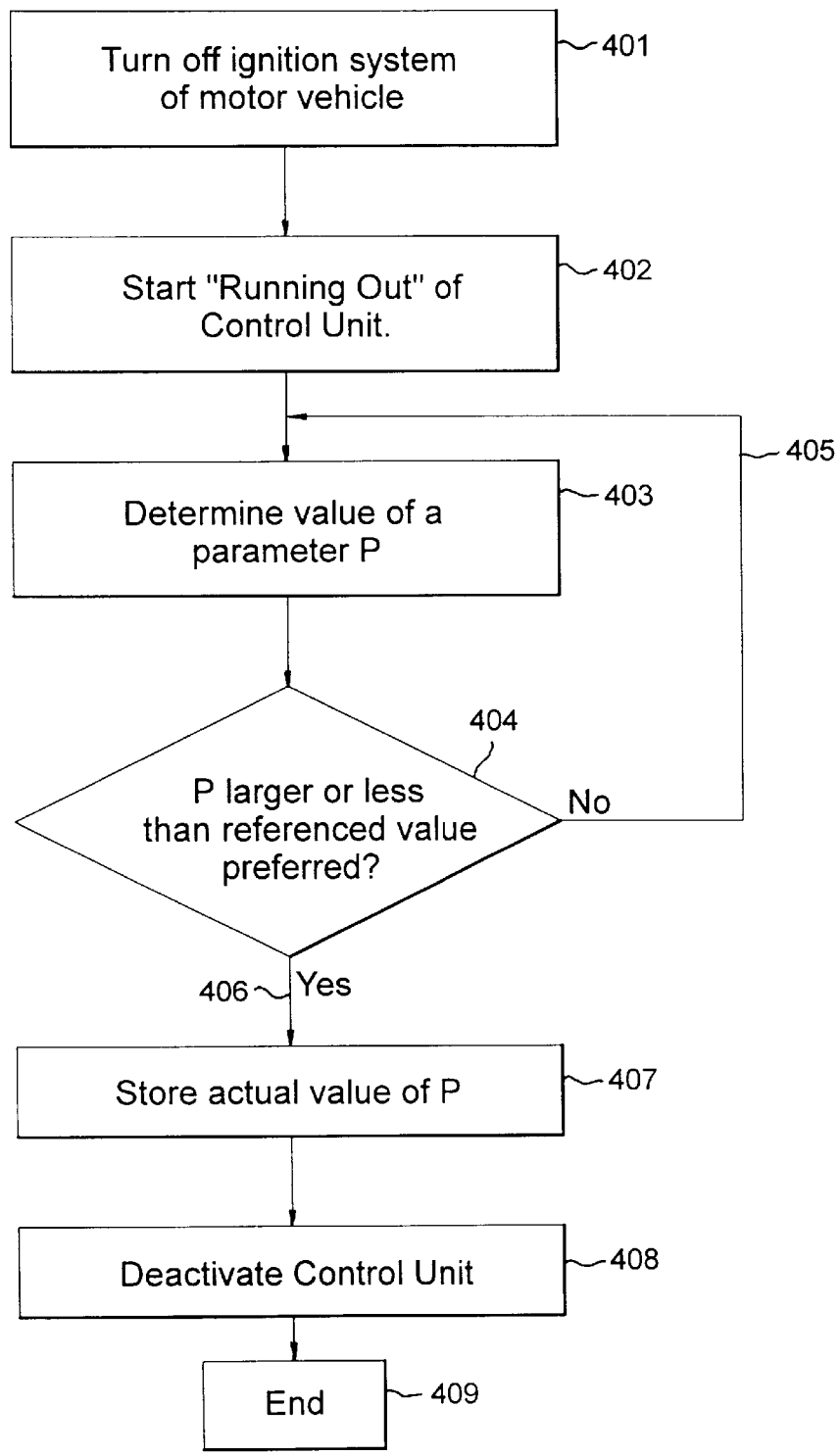
FIG. 8 is a flow chart illustrating the "tracking" (follow-up or running-out) performed by the control unit.

FIG. 8 is a flow chart which illustrates the "trailing" (follow-up or running-out) process of the control unit. Step 401 denotes the turning off of the ignition system by the operator. Such turning off initiates (see step 402) the start of the running out of the control unit, and step 403 denotes the determination of the value (magnitude) of a parameter P by the control unit. The parameter P, can constitute the temperature of the torque transmitting system, as calculated by the control unit, or another value such as an operative value (parameter) of the vehicle. Step 403 further denotes the storing of the actual value in a storage unit based upon the determination of such value (parameter). Step 404 denotes an addressing or recovering step which serves to ascertain whether the determined or otherwise obtained value P is above or below a reference value $P_{ref}$. If the outcome of such addressing is negative, the determination of the value P is repeated at a later time (see the branch 405). If the addressing at 404 is positive, the process continues (via branch 406) to step 407 where the actual value of P is stored in memory. Next, step 408 denotes a deactivation of the control unit, and step 409 denotes the termination of the process.

A further development of the invention provides that the control unit store in memory at least one actual parameter at the time of turning off of the ignition system, such as for example a calculated temperature and also the instant of turning off of the ignition. When the ignition system is turned on again, the control unit determines the actual time and/or the time differential (interval) which has elapsed since the last turning off of the ignition. By resorting to such actual time, it is possible to calculate the time differential by further taking into consideration the stored time of turning off of the ignition system. If the temperature at the time of turning off and the time differential (interval) from the last turning off are available, one can ascertain the actual temperature of a component part. The ascertainment of the temperature can be carried out iteratively. Furthermore, the control unit can obtain, for example, by way of a data bus, the actual time from a different source so that it can determine the time differential on the basis of the stored instant of turning off of the ignition system. Furthermore, it is possible to ascertain the time differential from another electronic unit, and such time differential is then made available to the control unit so that the latter can utilize such information for a determination of the actual temperature. For example, such other electronic unit can constitute the control electronics of the engine, the control electronics for the transmission, ABS electronics, ASR electronics or a digital clock. ABS is an abbreviation for antiblocking system, and ASR is an abbreviation for the antislip regulation system.

This procedure denotes a running out (i.e., a last stage of operation) of the control unit until, for example, the calculated or otherwise ascertained temperature of the torque transmitting system has dropped below a certain limit so that the stored value can be utilized as a reference value at the renewed starting of the engine. In the next step, the control unit is deactivated or it deactivates itself.

Figure 9:
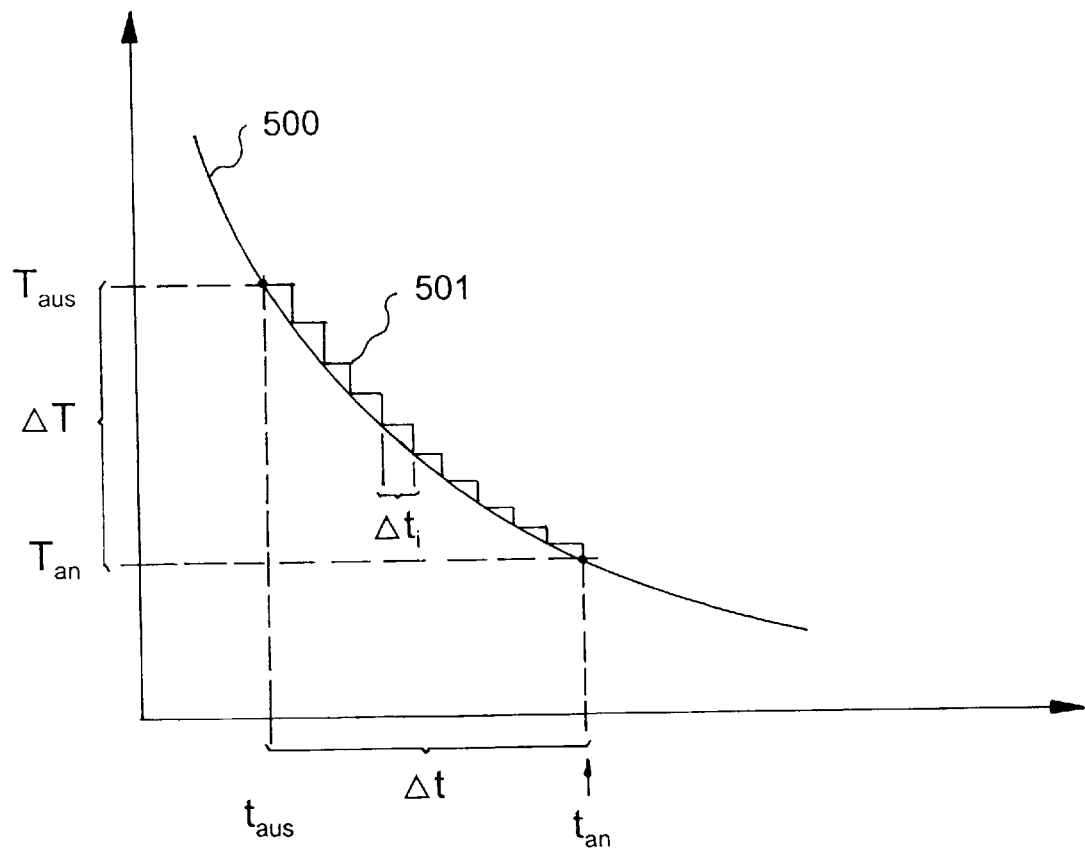
FIG. 9 is a graph of temperature vs. time for a component part.

FIG. 9 illustrates the temperature curve 500 as a function of time of a component part, such as for example that of a torque transmitting system. Only cooling factors were resorted to in connection with the determination of the temperature denoted by the curve 500. This means that the temperature has risen to a certain value and, following for example the turning off of the ignition system, has dropped as a result of the absence of energy input. Thus, the curve 500 is actually indicative of cooling.

If, at the time instant $t_{aus}$, the temperature $T_{aus}$ is known and if the time instant of restarting $t_{an}$ is also known, the temperature difference $\Delta T$ and the final temperature $T_{an}$ at the time instant $t_{an}$ can be calculated or otherwise ascertained as a function of the cooling curve 500. The stepwise progress at 501 between the temperatures $T_{aus}$ and $T_{an}$ indicates an iterative calculation of the temperature $T_{an}$, with the temperature at the time instant t+$\Delta t$ being calculated on the basis of the temperature at time t. This procedure is carried out until the temperature at time instant $t_{an}$ is ascertained. Due to the cyclical operation of the control unit, $\Delta=n*\Delta t$. The temperature can be ascertained by resorting to the aforedescribed methods on the basis of the temperature at the instant of turning off, or out, and the time which has elapsed after the turning off. The data at the instant of the turning off, or out, can be stored in memory and the information regarding the time can be obtained from a continuously running clock.

It is advantageous if, at the time of a renewed starting of the vehicle and of the control unit, the actual temperature need not be measured by resorting to a sensor but can instead be calculated. It is also advantageous (desirable) that the calculated temperature be accurate within a known error range of the calculation rather than the temperature being high after turning off shortly after turning on and the temperature set by the control unit being too low. Under such circumstances, the temperature dependent factors or parameters, which were resorted to during the controlling operation, would exhibit an excessive departure and the reaction of the control unit would be more uncomfortable due to the wrong operating point than in response to a properly (accurately, correctly) determined temperature.

A cooling curve for determining the actual temperature based on the instant of turning off, the actual time and the temperature at the time of turning off can be ascertained on the basis of the following equation $$T_{aktuell} = A_1 + (T_{abstell} - A_2) * A_3 / (A_4 + t_{aktuell} - t_{abstell}) \qquad (7)$$

wherein $T_{aktuell}$ is the actual temperature, $T_{abstell}$ is the temperature at the instant of turning off, $A_1$, $A_2$, $A_3$ and $A_4$ are factors or summands, $t_{aktuell}$ is the actual time instant and $t_{abstell}$ is the instant of turning off the engine. The factors or summands $A_1$ through $A_4$ can be selected in dependency upon predetermined (preselected) conditions in the vehicle.

When the vehicle is not in use or when the ignition system of the vehicle is off, the control unit for an automated clutch or for an automated transmission can be maintained in operation for a certain preselectable interval of time or it can remain in operation for such interval of time. During such period of running out, it is possible to carry out a variety of functions (operations). For example, the control unit can carry out an adaptation of parameters, or it can calculate the actual temperature of the torque transmitting system. It is also possible to react to occurring or developing disturbances with appropriate undertakings. In such instances, the control unit detects, on the basis of incoming signals, the operating condition of the vehicle. When such signals or certain signals reach or exceed a threshold value, it is possible to carry out a planned regulation (adjustment), for example, of the transmission or of the torque transmitting system, to thus influence (eliminate) the developed condition (situation).

A possible circumstance for advantageous introduction or utilization of an activated control unit subsequent to turning off of the ignition system for the engine (deactivation of the vehicle) is described with reference to the following example. In the case of using an actor for the automated torque transmitting system with minimal or nonexistent self-blocking, the pusher of the actor can be automatically shifted from the zero or idle position due to the spring force of the torque transmitting system, such as the force of a diaphragm spring, or due to the supporting action of the force of a compensating spring, because the described spring bias exists also subsequent to turning off of the ignition system. This can result in the piston of the master cylinder, which is clipped to, hooked on, or otherwise attached to the pusher of the actor, sealing the sniffing bore (see the bore 21 in FIG. 1) of the volume compensating arrangement of the hydraulic system. Due to such sealing of the sniffing bore, a volume compensation can no longer take place, for example, in response to changes of the temperature of the fluid column (see the conduit 17 in FIG. 1 or the conduit 109 in FIG. 2) in the region of the path for the flow of fluid. A warming up or a cooling of the path for the fluid while the vehicle is idle can entail an expansion or contraction of the fluid, and this can lead to a disengagement of the clutch. In order to prevent this, it is possible or advisable that, during the continued operativeness of the actor subsequent to a stoppage of the vehicle (actually, subsequent to turning off of the ignition system), the hydraulic system be monitored by internal distance sensors which transmit corresponding signals until the temperature of the torque transmitting system and/or of the hydraulics reaches a constant level or until the still existing (lagging) heating action is terminated. For example, if a heating of the hydraulic path causes a disengagement of the clutch, one can resort to an automated readjustment to ensure a fluid equalization so that a potential heating will not result in an undesired or undesirable disengagement of the torque transmitting system.

FIG. 10 is a schematic representation of the power train of a motor vehicle with a driving unit 601, such as a combustion engine or motor, a torque transmitting system 602, such as for example a friction clutch, a dry friction clutch or a wet friction clutch, a transmission 603, a differential 604, drive shafts 605, and wheels 606 which receive torque from the shafts. The wheels 606 can be equipped with non-illustrated RPM sensors which detect the rotational speed of the wheels. The RPM sensors can also belong functionally to other electronic units, such as, for example, to an antiblocking system (ABS). The driving unit 601 can constitute a hybrid drive, for example, with an electric motor, a flywheel with a freewheel, and a combustion engine.

The torque transmitting system 602 constitutes a friction clutch but it is also possible to employ a torque transmitting system which is or which includes, for example, a magnetic powder clutch, a disc clutch, a torque converter with a bypass (lockup) clutch, or another clutch. There is further shown a control unit 607 and a schematically represented actor 608. The friction clutch 602 can constitute a self-adjusting clutch with automatic compensation for wear.

The torque transmitting system 602 is mounted on or is connected with a flywheel 602a. The flywheel 602a can be a split flywheel with a primary mass, a secondary mass, and a damping device between the primary and secondary masses. A starter gear 602b is provided on one of the two masses. The torque transmitting system 602 comprises a clutch disc 602c with friction linings, a pressure plate 602d, a clutch cover or housing 602e, and a diaphragm spring 602f. The torque transmitting system 602 is assumed to be a self-adjusting clutch which further comprises means permitting an adjustment and a compensation for wear. There is provided a sensor, such as a force or distance sensor, which detects the situations or circumstances necessitating an adjustment and under which circumstances an adjustment can be carried out in response to detection.

The torque transmitting system 602 is actuated by a disengaging device 609, such as, for example, a pressurized-fluid-operated (e.g., hydraulic) central disengager. The disengager can carry a disengaging bearing 610 and can act upon the clutch to engage or disengage the same. The disengager can also constitute a mechanical disengaging means which actuates, exerts pressure upon, or services a disengaging bearing or an equivalent element.

The actor 608, such as an actuating unit, controls by way of a conduit or an analogous movement transmitting means (e.g., a hydraulic conduit), the central disengager or disengaging device 609 which is responsive to pressurized fluid, e.g., a hydraulic fluid, to engage or disengage the clutch. The actor 608 further comprises one or more output elements for the actuation of the transmission, i.e., to shift the transmission into different gears. For example, the output element or elements of the actor 608 can actuate a central shaft of the transmission. Thus, the actor is designed to actuate internal shifting elements of the transmission in order to shift into or out of a selected gear ratio or to shift from one gear ratio to another. The internal element or elements of the transmission can include the aforementioned central shaft or several shafts or other shifting elements or means.

The actor 608 can be designed to constitute or to function as a shifting-roller actor which is installed in the transmission. The shifting roller can be driven to rotate and to thus actuate elements which are compelled to move along guides, and such elements can serve to shift the transmission into selected gears. Furthermore, an actor which is to select the gear ratios of the transmission can comprise (contain) an actor for the actuation of the torque transmitting system; under such circumstances, it is necessary to provide an operative connection with the clutch disengaging means.

The control unit 607 is connected with the actor 608 by signal transmitting means 612 to thus permit an exchange, transmission or determination of control signals and/or sensor signals or signals denoting the operating condition. There are further provided signal transmitting connections 613 and 614 which serve to connect the control unit 607 with further sensors or electronic units for at least temporary (intermittent) transmission (exchange) of signals. For example, such additional electronic units can constitute engine electronics, the electronics of an antiblocking system and/or the electronics of an antislip system. Additional sensors can constitute sensors which determine or ascertain or characterize the operating condition of the vehicle in general, and these additional sensors can include RPM sensors for the engine or for the wheels, throttle valve sensors, gas pedal position sensors or others. The signal transmitting path 615 establishes a connection to a data bus, such as for example a CAN (or LAN) bus which can furnish system data pertaining to the vehicle or to other electronic units since the electronic units are normally interlinked by computer units.

An automated transmission can be shifted into or caused to change a gear ratio in such a way that this is initiated by the operator of the vehicle in that the operator actuates, for example, a switch to generate a signal for the shifting of the transmission into a higher gear or a lower gear. Furthermore, it is possible to provide or furnish a signal by means of an electronic shifting lever to indicate the gear into which the transmission is to be shifted. An automatic transmission can automatically complete a shift into a different gear ratio without it being necessary that such shift be initiated by the operator, for example, by means of characteristic values, characteristic curves, characteristic fields, or on the basis of signals from sensors under certain predetermined circumstances.

The vehicle is preferably equipped with an electronic gas pedal 623 or load lever, the gas pedal 623 serving to control a sensor 624 by means of which the engine electronics 620 control or regulate, for example, the supply of fuel, the timing of ignition, the duration of fuel injection, or the position of the throttle valve by way of a signal transmitting conductor 621 of the engine 601. The electronic gas pedal 623 and its sensor 624 are connected, in a signal-transmitting manner, with the engine electronics 620 by way of a signal transmitting conductor 625. The engine electronics 620 are connected, in a signal-transmitting manner, with the control unit 607 by way of a signal transmitting path 622. Furthermore, the control electronics 630 for the transmission 603 can be connected with the units 607 and 620 in a signal transmitting manner. It is then advisable to provide a throttle valve control (adjustment) which employs an electric motor, the position of the throttle valve being selected or selectable by the engine electronics. In such systems, it is no longer necessary or desirable to provide a direct mechanical connection to the gas pedal.

In order to calculate or to otherwise ascertain a transmission temperature, such as for example the temperature of the transmission fluid or the temperature of a component part of the transmission, it is possible to resort to the typical friction losses of the component parts of the transmission, to the input RPM, and/or to the output RPM of the transmission. Furthermore, it is possible to take into consideration the quantities and the flows of fluid. Still further, it is possible to carry out the calculation by taking into consideration other values (parameters). However, the determination of the temperature of the transmission should not be limited to the running out time but can also be carried out under other operational circumstances.

For example, the connection between the source of electrical energy and the control unit for an automated transmission and/or for an automated torque transmission system can be maintained in order to continue to carry out certain specific functions (operations) subsequent to an inactivation of the vehicle (turning off of the ignition system). One such function is, for example, when a critical situation is ascertained during calculation or other mode of determination of the temperature, for example, by resorting to temperature models. The critical situation can involve the clutch, the transmission, the synchronizing means or, for example, when adaptations are in process or when data are being ascertained or stored, such as storing data or adapted values in an EEPROM. It is possible to carry out additional adaptations of system values of an electric motor, of a transmission or of a pressurized fluid system, such as a hydraulic system. Furthermore, it might become necessary or advisable to carry out adjustments in the transmission or at the clutch (for example when the vehicle arresting system is actuated) in order to ascertain frictional forces (sliding or static friction forces or friction values) and characteristic values of the actor (e.g., engine constants, such as armature resistance or time constants in an electric motor). Furthermore, one can adjust (balance) hydraulic or other parameters, such as the characteristic curves of valves or other values.

Furthermore, it can be advantageous if the control unit or the actuating system remains active during the running-out interval in order to be in a position to select a predetermined or desired position or condition of the clutch or of the transmission, such as for example, activating a parking brake or selecting a gear ratio which causes a blocking of the movements of the vehicle in the parked condition, or to ascertain the requirements for other units and to transmit such information. The other control units are also activated or remain active during the running out interval.

What is claimed is:

1. In an apparatus for automated actuation of at least one of a torque transmitting system and a transmission in the power train of a vehicle with a driving aggregate, with a control unit which communicates with sensors and which is activated in response to turning on of an ignition system of the vehicle, and with an actuator which is activatable by the control unit to actuate the torque transmitting system, the improvement which resides in that, upon deactivation of the ignition system of the vehicle, the control unit remains active for a period of time dependent upon at least one parameter.

2. The improvement according to claim 1 wherein, upon deactivation of the ignition system, the control unit remains active as a function of time.

3. The improvement of claim 1 wherein, upon deactivation of the ignition system, the control unit remains active in dependency upon a plurality of parameters and is operative to deactivate itself automatically upon at least one of reaching, not reaching and exceeding a preselectable threshold value.

4. The improvement of claim 1, wherein the control unit is arranged to determine, as a function of time, at least one temperature of at least one of (a) the torque transmitting system and (b) the transmission and to store the at least one temperature in a data storage unit, the control unit being further arranged to remain active upon deactivation of the ignition system until the thus determined temperature reaches, exceeds or fails to reach a preselectable threshold value.

5. The improvement of claim 1, further comprising means for iteratively determining a temperature of at least one component part of at least one of the torque transmitting system and the transmission.

6. The improvement of claim 5, wherein the temperature $T_n$ at the time instant $t_n$ is determined in accordance with the equation $$T_n = T_{n-1} + P_{zu}*\Delta t/C - \alpha*T_{n-1}*\Delta t/C$$

wherein $T_{n-1}$ denotes the temperature at the time instant $t_n-1$, $\Delta t = T_n - T_{n-1}$, C is the heat capacity of one of (a) a component part of the torque transmitting system and (b) the transmission, $\alpha$ is a cooling factor, and $P_{zu}$ denotes the supplied calculated heat output.

7. The improvement of claim 6, wherein the cooling factor $\alpha$ is determined in accordance with the equation $$\alpha = F_4 + (F_2 + F_3 * n_m) * F_1$$

wherein $n_m$ is the RPM of the driving aggregate and the values $F_1$ through $F_4$ are preselectable parameters.

8. The improvement of claim 1 wherein, upon ascertainment of temperatures of two component parts of at least one of the torque transmitting system and the transmission, the temperature $T_{a,n}$ of the first component part at the instant $t_n$ is determined in accordance with the equation $$T_{a,n} = T_{a,n-1} + (P_{zu} - P_{transfer}) * \Delta t/C$$

and the temperature $T_{b,n}$ of the second component part is determined in accordance with the equation $$T_{b,n} = T_{b,n-1} + (P_{transfer} - P_{kühl}) * \Delta t/C$$

wherein $P_{zu}$ denotes the supplied heat output, $P_{transfer}$ denotes the output which is transferred between the two component parts, $P_{kühl}$ denotes the cooling output, $T_{a,n-1}$ and $T_{b,n-1}$ denote the temperatures at the time instant $t_{n-1}$, $\Delta t = t_n - t_{n-1}$, and $C_1$ and $C_2$ denote the thermal capacities of the first and second component parts.

9. The improvement of claim 1, wherein the control unit is arranged to store and address data in and from at least one memory unit.

10. The improvement of claim 1, further comprising a signal conductor arranged to receive and to transmit to said control unit signals indicative of time.

11. The improvement of claim 1, wherein said transmission is a manually shiftable transmission.

12. The improvement of claim 1, wherein said transmission is an automated transmission.

13. The improvement of claim 1 wherein, at least during the still activated phase following deactivation of the ignition system of the vehicle, the control unit is arranged to monitor the positions of the actuating means for the actuation of at least one of the torque transmitting system and the transmission by means of at least one sensor to initiate an adjustment of the actuating means to a desired position when a preselectable position is exceeded.

14. The improvement of claim 1, wherein the control unit includes means for determining at least one of actual gear ratio and engine torque.

15. The improvement of claim 1, wherein the control unit includes means for determining the occurrence of excessive slip and for undertaking corrective action in response thereto.

16. The improvement of claim 1, wherein the control unit is arranged to determine temperature using temperature dependent values.

17. The improvement of claim 16, wherein said values are indicative of a gear shifting force.

18. The improvement of claim 1, wherein said control unit comprises a memory unit arranged to memorize the time of ignition turnoff and a corresponding value of a given parameter at said time of ignition turnoff, said control unit further comprising means for calculating an actual value of said given parameter at a subsequent time of ignition turn on.

19. The improvement of claim 1, wherein the control unit is part of a LAN network interconnecting the control unit with at least one other control unit.

20. In an apparatus for automated actuation of a transmission in the power train of a motor vehicle with a driving aggregate and a torque transmitting system, with a control unit which communicates with sensors and is activated in response to turning on of the ignition system of the vehicle, and with an actuator which is activatable by the control unit to actuate the transmission, the improvement which resides in that upon deactivation of the ignition system of the vehicle, the control system remains active in dependency upon at least one operational parameter.

21. The improvement of claim 20 wherein, upon deactivation of the ignition system, the control unit remains active in dependency upon a plurality of parameters and is operative to deactivate itself automatically upon at least one of reaching, not reaching and exceeding a preselectable threshold value.

22. The improvement of claim 20 wherein, upon deactivation of the ignition system, the control unit remains active as a function of time.

23. In an apparatus for automated actuation of at least one of (a) a torque transmitting system and (b) a transmission in the power train of a vehicle with a driving aggregate, a control unit which communicates with sensors and is activated in response to turning on of the ignition system of the vehicle, and with an actuator which is activatable by the control unit to actuate the torque transmitting system, the improvement which resides in that upon deactivation of the ignition system, the control unit remains actuated for a limited interval of time including the duration of at least one of the trailing, running out and follow-up times, the control unit being arranged to become deactivated upon elapse of said at least one time.

24. A method of automated actuation of a torque transmitting system in the power train of a vehicle with a driving aggregate and a transmission, with a control unit which communicates with sensors and which is activated in response to turning on of the ignition system of the vehicle, with an actuator which is activatable by the control unit to actuate the torque transmitting system, comprising the steps of deactivating the ignition system of the vehicle; and
maintaining the control unit active for a period of time which is a function of at least one parameter.

25. The method of claim 24, wherein said maintaining step includes maintaining the control unit active for a period of time which is a function of time.

26. The method of claim 24, further comprising the step of automatically deactivating the control unit upon termination of said maintaining step.

27. The method of claim 24, further comprising the steps of utilizing the control unit to determine, as a function of time, at least one temperature of at least one of (a) the torque transmitting system and (b) the transmission and storing the at least one temperature in a data storage unit, said maintaining step comprising maintaining the control unit active until the determined temperature at least reaches, exceeds or fails to reach a preselectable threshold value.

28. The method of claim 24, further comprising the step of iteratively determining a temperature of at least one component part of at least one of (a) the torque transmitting system and (b) the transmission.

29. The method of claim 28, further comprising the step of calculating the temperature $T_n$ at a time instant $t_n$ in accordance with the equation $$T_n = T_{n-1} + P_{zu} * \Delta t/C - \alpha * T_{n-1} * \Delta t/C$$

wherein $T_{n-1}$ denotes the temperature at the time instant $t_{n-1}$, $\Delta t = T_n - T_{n-1}$, C is the heat capacity of a component part of at least one of the (a) the torque transmitting system and (b) the transmission, $\alpha$ is a cooling factor and $P_{zu}$ denotes the supplied calculated heat output.

30. The method of claim 29, further comprising the step of calculating the cooling factor $\alpha$ in accordance with the equation $$\alpha = F_4 + (F_2 + F_3 * n_m) * F_1$$

wherein $n_m$ is the RPM of the driving aggregate and the values $F_1$ through $F_4$ are preselectable parameters.

31. The method of claim 24, further comprising the step of ascertaing two temperatures of two component parts of at least one of (a) the torque transmitting system and (b) the transmission, the temperature $T_{a,n}$ of the first component part at the instant $t_n$ being determined in accordance with the equation $$T_{a,n} = T_{a,n-1} + (P_{zu} - P_{transfer}) * \Delta t/C$$

and the temperature $T_{b,n}$ of the second component part being determined in accordance with the equation $$T_{b,n} = T_{b,n-1} + (P_{transfer} - P_{kühl}) * \Delta t/C$$

wherein $P_{zu}$ denotes the supplied heat output, $P_{transfer}$ denotes the output which is transferred between the two component parts, $P_{kühl}$ denotes the cooling output, $T_{a,n-1}$ and $T_{b,n-1}$ denote the temperatures at the time instant $t_{n-1}$, $\Delta t = t_n - t_{n-1}$, and $C_1$ and $C_2$ denote the thermal capacities of the first and second component parts.

32. The method of claim 25, further comprising the steps of providing the control unit with at least one memory unit, storing data in the at least one memory unit, and recovering data from the at least one memory unit.

33. The method of claim 32, wherein the transmission is automated by at least one actuator.

34. The method of claim 32, further comprising the steps of utilizing the control unit to monitor the positions of the actuating means for the actuation of at least one of (a) the torque transmitting system and (b) the transmission by means of at least one sensor, and initiating an adjustment of the actuating means to a desired position when a preselectable position is exceeded, said utilizing and initiating steps taking place simultaneously with said maintaining step.

35. The method of claim 32, further comprising the step of utilizing the control unit to determine at least one of actual gear ratio and the torque of the driving aggregate.

36. The method of claim 32, further comprising the step of utilizing the control unit to determine the extent of slip and to undertake a corrective action when the extent of determined slip exceeds a predetermined value.

37. The method of claim 32, further comprising the step of utilizing the control unit to determine temperature on the basis of temperature-dependent values.

38. The method of claim 32, wherein said data include the times of ignition turn off and ignition turn on, and further comprising the step of utilizing the control unit to process said data.

39. The method of claim 32, further comprising the step of connecting the control unit, as a part of a LAN network, with at least one additional control unit.

40. The method of claim 24, further comprising the step of utilizing the control unit to generate and receive time-indicating signals.

41. The method of claim 24, wherein the transmission is a manually shiftable transmission.

42. The method of claim 24, further comprising the steps of utilizing the control unit prior to its deactivation for storage of parameters or data and for addressing and recovering the data or parameters following renewed activation of the control unit.

43. The method of claim 42, further comprising the step of processing the recovered data or parameters for the calculation of actual values at the instant of renewed activation of the control unit.

44. The method of claim 43, wherein said stored parameters or data include (a) at least one existing temperature at an instant shortly prior to deactivation of the control unit, and (b) the time of deactivation of the control unit.

45. The method of claim 43, wherein said processing step includes utilizing the stored parameters or data for the determination of at least one actual temperature at the time of renewed activation of the control unit.

46. A method of automated actuation of at least one of (a) a torque transmitting system and (b) a transmission in the power train of a vehicle with a driving aggregate, a control unit which communicates with sensors and is activated in response to turning on of the ignition system of the vehicle, and with an actuator which is activatable by the control unit to actuate the torque transmitting system, comprising the steps of maintaining the control unit actuated following deactivation of the ignition system for a limited interval of time; and deactivating the control unit upon elapse of the trailing time including follow-up and running-out time.

* * * * *